US 8,055,195 B2

(12) United States Patent
Blum et al.

(10) Patent No.: US 8,055,195 B2
(45) Date of Patent: Nov. 8, 2011

(54) CELLULAR RADIO COMMUNICATOR AND METHOD FOR CONFIGURING THE SAME

(75) Inventors: William R. Blum, Huntington Station, NY (US); Christopher Beach, West Islip, NY (US)

(73) Assignee: Honeywell International Inc., Morristown, NJ (US)

( * ) Notice: Subject to any disclaimer, the term of this patent is extended or adjusted under 35 U.S.C. 154(b) by 722 days.

(21) Appl. No.: 11/967,703

(22) Filed: Dec. 31, 2007

(65) Prior Publication Data

US 2009/0170495 A1 Jul. 2, 2009

(51) Int. Cl.
*H04B 7/00* (2006.01)
(52) U.S. Cl. ......... 455/41.2; 455/59; 455/419; 455/509; 340/506; 340/531
(58) Field of Classification Search .................. 455/41.2, 455/59, 401.1, 401.2, 419, 434, 450, 509, 455/515; 340/506, 531, 539.1, 539.14, 539.26
See application file for complete search history.

(56) References Cited

U.S. PATENT DOCUMENTS

| | | | |
|---|---|---|---|
| 6,546,246 B1 * | 4/2003 | Bridges et al. | 455/432.1 |
| 6,624,750 B1 | 9/2003 | Marman et al. | |
| 7,019,646 B1 | 3/2006 | Woodard et al. | |
| 7,177,639 B2 * | 2/2007 | Winick et al. | 455/434 |
| 7,239,883 B2 | 7/2007 | Van Bosch | |
| 7,464,170 B2 * | 12/2008 | Yokoyama | 709/231 |
| 2008/0200218 A1 * | 8/2008 | Bobst | 455/572 |

* cited by examiner

*Primary Examiner* — Tuan H Nguyen
(74) *Attorney, Agent, or Firm* — Husch Blackwell

(57) ABSTRACT

A wireless communications device comprising a communications section adapted to communicate with a remote device using at least two wireless carriers, a signal detection section for detecting a control signal in a communications path between the wireless communications device and the at least two wireless carriers, said signal detection section generating a detection result, and a control section for evaluating the detection result and setting one of the at least two carriers as a primary communications path for communication with the remote device and one of the at least two carriers as a secondary communications path for communication with the remote device based upon the evaluation.

12 Claims, 3 Drawing Sheets

CELLULAR RADIO COMMUNICATOR AND METHOD FOR CONFIGURING THE SAME

FIELD OF THE INVENTION

The present invention relates generally to wireless communications devices, security systems and alarm reporting systems, and more particularly the present invention pertains to a method for configuring and controlling a radio device. The invention further pertains to radio device adapted for communication using multiple carriers.

BACKGROUND

Wireless communications devices such as cellular devices are become prevalent in security systems for reporting the status of the systems to a remote device. The integrity of a system is dependent on a 100% availability of a communication path between the wireless communications device and the remote device. With a single communications path wireless system, 100% availability cannot be guaranteed, due to noise within the communication path or other attenuation electromagnetic characteristics of the surrounding environment. Therefore, a redundant communications path is needed. In fact, in UL listed communications systems for reporting fire alarms, two separate communications paths are required. Each of the communications paths must be periodically tested. A test call is placed periodically (e.g. once daily) to ensure that the two connections are operating properly in the event that a real fire had to be reported.

Wireless devices, such as a cellular device provides a unique problem, as the device typically is only capable of communicating over one communications path. Specifically, a cellular telephone is programmed to communicate through only one cell base station and not to communicate through two separate cell base stations.

U.S. Pat. No. 7,177,639, issued to Winick et al., on Feb. 13, 2007, assigned to Honeywell International, Inc., describes a dual site supervision for a control channel cellular radio for a fire alarm reporting system that uses logic that causes the normal control channel cellular transceiver to operate in a nonstandard manner and to use a different and second cellular base station that the unit would normally not select operating pursuant to a standard cell phone software module.

However, there is still a need to have a wireless device adapted for communication with two independent and distinct networks or carriers that ensures that a communications path to a remote site is always available.

SUMMARY OF THE INVENTION

Accordingly, disclosed is a wireless device having the ability to communicate with remote devices using multiple carriers. The wireless communications device comprises a communications section adapted to communicate with a remote device using at least two wireless carriers, a signal detection section for detecting a control signal in a communications path between the wireless communications device and the at least two wireless carriers, the signal detection section generating a detection result, and a control section for evaluating the detection result and setting one of the at least two carriers as a primary communications path for communication with the remote device and one of the at least two carriers as a secondary communications path for communication with the remote device based upon the evaluation.

The communications section comprises a radio device with a single Subscriber Identity Module (SIM) capable of switching between a plurality of wireless carriers. Alternatively, the communications section comprises first radio device with a first Subscriber Identity Module (SIM) adapted to communicate using a first wireless carrier, and a second radio device with a second Subscriber Identity Module (SIM) adapted to communicate using a second wireless carrier. The second wireless carrier is different from the first wireless carrier. The first and second wireless carriers are dynamically selected based upon a selected criterion. Alternatively, the communications section comprises a first radio device adapted to communicate using a first wireless carrier using a first communications protocol, and a second radio device adapted to communicate using a second wireless carrier using a second communications protocol. The second L communications protocol is different from the first communications protocol. The communications protocol can be a Global System for Mobile (GSM), Time Division Multiple Access System (TDMA), Code Division Multiple Access System (CDMA), and/or Advanced Mobile Phone System (AMPS) protocol.

The selecting and setting of the primary and second communications paths, i.e., primary and secondary carriers can be based at least upon a wireless carrier preference. Alternatively, the selecting and setting of the primary and second communications paths can be based at least upon a received signal strength of the control signal from the at least two wireless carriers.

If at least two wireless carriers are not detected, the control section will generate and transmit an error message to a remote monitoring station. Additionally, during installation, if two wireless carriers are not detected, the control section will cause an error message to be displayed to an installer.

The wireless communications devices can be used to report data to a remote monitoring station from any type of alarm system such as, but not limited to, a fire alarm system.

Also disclosed is a method for configuring a radio device for reporting a status of an alarm system. The method comprises scanning available control channels for at least two different wireless carriers, sorting the control channels into groups by wireless carrier, evaluating the sorted control channels, setting one of the at least two different wireless carriers as a primary carrier for communication with a remote device and setting one of the at least two different wireless carriers as a secondary carrier for communication with a remote device. The setting of the primary and secondary carriers is based upon the evaluation. An error signal is generated when at least two different wireless carriers are not available.

The method further comprises programming the radio device to switch from the primary carrier to the secondary carrier when a failure occurs with the primary carrier.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

The present invention includes a radio communications device, e.g. wireless devices adapted to communicate with a remote device, e.g., a central monitoring station, using multiple carriers, one carrier as a primary carrier and another carrier as a secondary carrier. When the communication path corresponding to the primary carrier is functioning, the wireless device will transmit a report to the remote device via the primary carrier, however, when there is a fault in the communication path corresponding to the primary carrier, the wireless device will automatically switch from the primary carrier to the secondary carrier.

Figure 1:
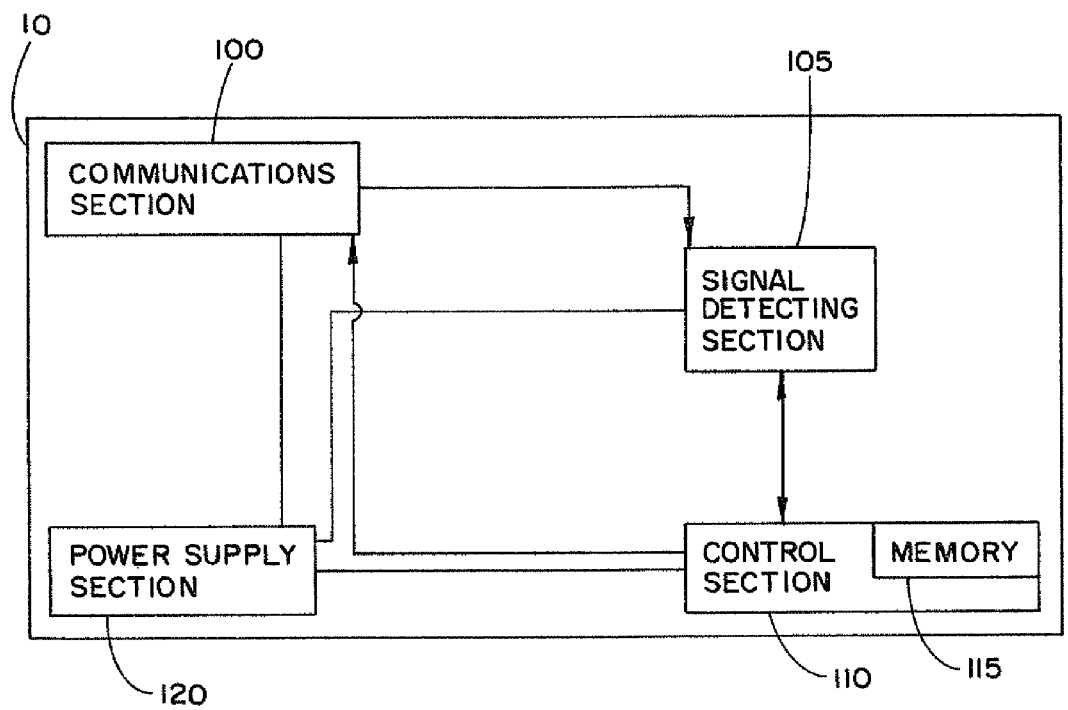
FIG. 1 illustrates a block diagram of a wireless device in accordance with the invention.

FIG. 1 depicts a block diagram of the wireless device 10. In an embodiment the wireless device 10 is a cellular device. The wireless device 10 includes a communications section 100. In one embodiment, the communications section 100 is a GSM cellular radio device. The GSM cellular radio device comprises a GSM network interface and a single Subscriber Identity Module (SIM) card (for purposes of the description the SIM card will be referenced as SIM). In this embodiment, the SIM is adapted to have the ability to communicate using multiple carriers. In other words, the SIM supports roaming and switching between multiple carriers.

In an alternate embodiment, the communications section 100 comprises two GSM cellular radio devices. Each of the GSM cellular devices comprises a GSM network interface and a single SIM. Each SIM is initialized to be able to communicate with one carrier In another alternate embodiment, the communications section 100 comprises two separate cellular devices. Each of the cellular devices is capable of communicating using a different wireless protocols. For example, the cellular device can use protocols such as CDMA, TDMA, GSM, and AMPS. Each of the two separate cellular devices is capable of transmitting data to a different cellular carrier using the different protocols.

In each embodiment, the communications section 100 is capable of using two different carriers for transmission.

The wireless device 10 further includes a signal detecting section 105. The signal detecting section 105 monitors or detects signals from the communications section 100. Specifically, the signal detecting section 105 scans all available carriers and channels for a control signal. The control signal is a signal periodically broadcast by a carrier, via its base station. The control signal is transmitted via a control channel. The control signal is used to transmit identifying information regarding the carrier. The signal detecting section 105 uses the identification information to output a detection result. The signal detecting section 105 also measures a received signal strength (RSSI) for each detected channel.

The wireless device 10 further includes a control section 110. The control section 110 is programmed with firmware that enables the control section 110 to perform the functionality described herein. The control section 110 includes a memory device 115. The memory device 115 contains preset list of wireless carriers and a preference list. The control section 10 receives as an input the detection result from the signal detecting section 105. The detection result can include a list of available channels, carrier identification for each channel and RSSI for each channel. The control section 110 selects two carriers from all of the available carriers as a primary and secondary carrier. The selected two carriers, i.e., primary and secondary, is stored in the memory device 115 for later use. In an embodiment, the primary and secondary carriers are selected based upon a preferred carrier list stored in the memory device 115. In another embodiment, the primary and secondary carriers are selected based upon the measured RSSI.

The control section 110 controls the wireless device 10 to communicate with a remote device using the primary carrier, if available. The control section 110 switches to the secondary carrier if the primary carrier has an error or a failure. If there is a failure in the primary carrier, the control section 110 transmits an error message to the remote monitoring station 220 using the secondary carrier.

The wireless device 10 also includes a power supply section 120. In an embodiment, the power supply section 120 is an internal battery.

Figure 2:
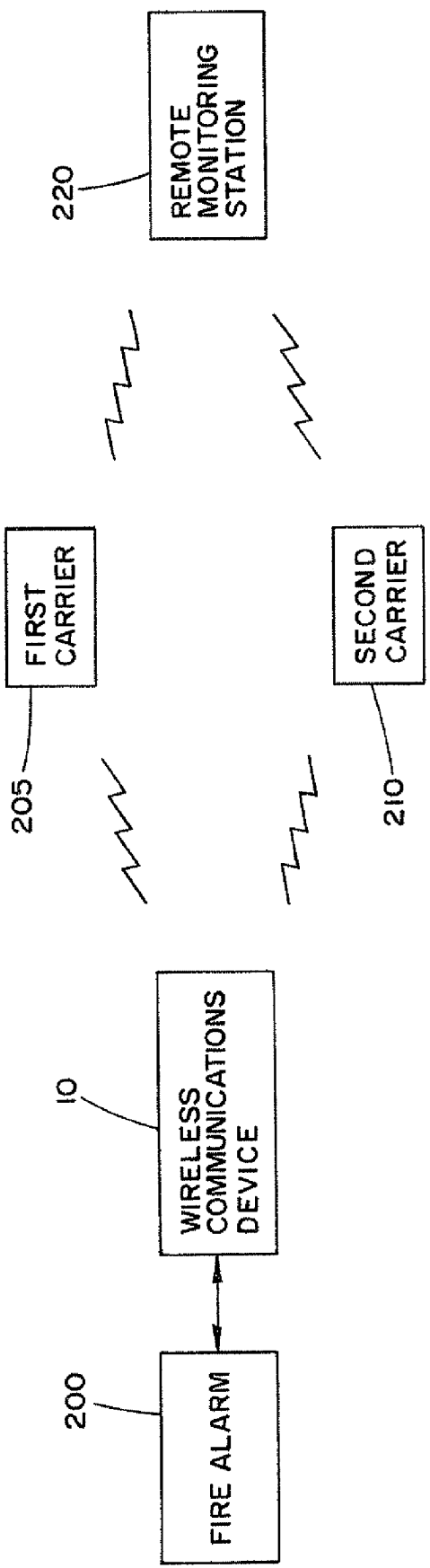
FIG. 2 illustrates a block diagram of an exemplary alarm reporting system according to the invention.

FIG. 2 illustrates an example of an alarm reporting system in accordance with the invention.

Figure 3:
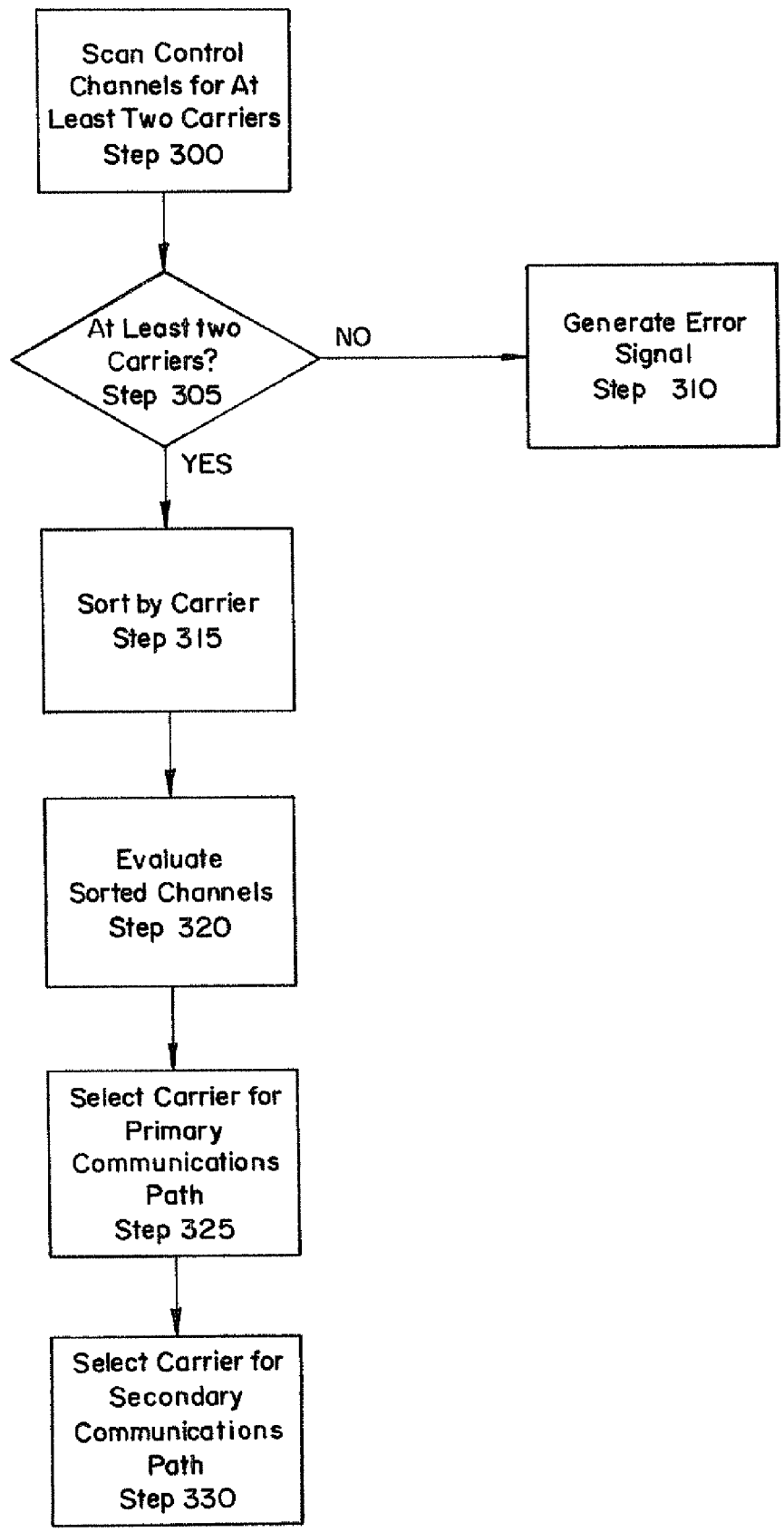
FIG. 3 illustrates a flow chart for a method of configuring the wireless device for multiple carrier communication in accordance with the invention.

As depicted the alarm reporting system is for a fire alarm device. The fire alarm device 200 is electrically coupled to the wireless device 10. While FIG. 2 illustrates the wireless device 10 electrically coupled to a fire alarm device 200, the wireless device 10 can be coupled with any type of alarm device, such as, but not limited to, an acoustic sensor, an impact sensor and asset sensor. The fire alarm device 200 periodically generates a status report. The status report is transmitted to a remote monitoring station 220 via the wireless device 10. As depicted, the wireless device 10 is capable of transmitting the report using a first carrier 205 or a second carrier 210. Either the first carrier 205 or second carrier 210 can be selected by the control section 110 as the primary and secondary carriers. Once selected and set, the signal detecting section 105 and control section 110 continuously supervises or monitors the control channels for the selected primary and secondary carriers to make sure that both are available. Additionally, in an embodiment, the control section 110 periodically changes the primary and secondary carriers based upon the monitoring of the carriers. The selection and setting of the primary and secondary carriers is described in to FIG. 3. In an embodiment, the selection and setting of the primary and secondary carrier can be performed both at installation and periodically during operation of the wireless device 10.

At step 300, the control channels for all available carriers are scanned. The control channels are scanned for two or more available carriers. The carrier is identified by information in the control channel. At step 305, the signal detection section 105 determines if there are two or more different carriers available. The determination is based upon the different identifiers in the control channel. If there are less than two different carriers available, an error signal is generated, at step 310. In an embodiment, the error signal is displayed on the wireless device. This display can be in the form of a visual indication such as a light. The indication notifies an installer that two carriers are not available. In response, the installer might change the locations of the wireless device 10 and alarm device. In another embodiment, the error signal is transmitted to the remote monitoring station 220, using the secondary carrier, once selected. In another embodiment, a default carrier is used to transmit the error signal.

If there are more than two different carriers available ("yes" as step 305), each scanned, detected and available control channel is sorted by carrier. Each of the sorted channels is evaluated for suitability as a primary and secondary carrier. In an embodiment, the evaluation criterion is a preferred carrier list stored in the memory device 115. In another embodiment, the evaluation criterion is a RSSI for each control channel. In another embodiment, a combination of both a preferred carrier list and RSSI is used.

At step 325, the primary carrier is selected and at step 330, the secondary carrier is selected.

Once selected, the wireless device 10 operates on the selected primary carrier.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A wireless communications device comprising:
a communications section adapted to communicate with a remote device using at least two wireless carriers;
a signal detecting section for detecting a control signal in a communications path between the wireless communications device and each of the at least two wireless carriers, said signal detecting section generating a detection result based upon the detection of the control signals; and
a control section for evaluating the detection result and, before communicating on either of the at least two wireless carriers, setting a first of the at least two carriers as a primary communications path for communication with the remote device and a second of the at least two carriers as a secondary communications path for communication with the remote device based upon the evaluation, wherein both the primary and secondary communications paths are simultaneously available for communication with the remote device.

2. The wireless communications device of claim 1, wherein said communications section comprises a radio device with a single Subscriber Identity Module (SIM) capable of switching between a plurality of wireless carriers.

3. The wireless communications device of claim 1, wherein said communications section comprises:
a first radio device with a first Subscriber Identity Module (SIM) adapted to communicate using a first wireless carrier, and
a second radio device with a second Subscriber Identity Module (SIM) adapted to communicate using a second wireless carrier, said second wireless carrier being different from said first wireless carrier, and said first and second wireless carriers being dynamically selected.

4. The wireless communications device of claim 1, wherein said communications section comprises:
a first radio device adapted to communicate using a first wireless carrier using a first communications protocol; and
a second radio device adapted to communicate using a second wireless carrier using a second communications protocol, said second communications protocol being different from said first communications protocol.

5. The wireless communications device of claim 1, wherein said first and second communications protocol is selected from a Global System for Mobile (GSM), Time Division Multiple Access System (TDMA), Code Division Multiple Access System (CDMA), and Advanced Mobile Phone System (AMPS) protocols.

6. The wireless communications device of claim 1, wherein said control section generates an error message if at least two wireless carriers are not detected.

7. The wireless communications device of claim 1, wherein said setting of the primary and second communications paths are based at least upon a wireless carrier preference.

8. The wireless communications device of claim 1, wherein said setting of the primary and second communications paths are based at least upon a received signal strength of the control signal from the at least two wireless carriers.

9. The wireless communications device of claim 1, wherein said wireless communications devices is used to report data from a fire alarm system to a remote monitoring station.

10. A method for configuring a radio device for reporting a status of an alarm system comprising the steps of:
scanning available control channels for at least two different wireless carriers;
sorting the control channels into groups by wireless carrier;
evaluating each of the sorted control channels;
before operating on either of the at least two different wireless carriers, setting a first of the at least two different wireless carriers based upon the evaluating as a primary carrier for communication with a remote device;
before operating on either of the at least two different wireless carriers, setting a second of the at least two different wireless carriers based upon the evaluating as a secondary carrier for communication with a remote device, wherein both the primary and secondary communication paths are simultaneously available for communication with the remote device; and
after the first of the at least two different wireless carriers is set as the primary carrier and the second of the at least two different wireless carriers is set as the secondary carrier, operating on the primary carrier.

11. The method for configuring a radio device for reporting a status of an alarm system according to claim 10, further comprising the step of generating a error signal when at least two different wireless carriers is not available.

12. The method for configuring a radio device for reporting a status of an alarm system according to claim 10, further comprising the step of programming the radio device to switch from the primary carrier to the secondary carrier when a failure occurs with the primary carrier.

* * * * *